United States Patent [19]
Mazur

[11] 3,887,211
[45] June 3, 1975

[54] STEERING LINKAGE
[75] Inventor: Sylvester S. Mazur, Detroit, Mich.
[73] Assignee: TRW Inc., Cleveland, Ohio
[22] Filed: Aug. 17, 1970
[21] Appl. No.: 64,404

[52] U.S. Cl.............................. 280/95 R; 74/588
[51] Int. Cl............................................. B62d 7/16
[58] Field of Search.................. 280/95, 96, 96.2 B; 74/588

[56] References Cited
UNITED STATES PATENTS

| | | | |
|---|---|---|---|
| 2,146,149 | 2/1939 | Leighton........................... | 280/95 X |
| 2,448,851 | 9/1948 | Wharam et al. ................. | 280/95 X |
| 3,028,172 | 4/1962 | Herbenar............................ | 280/95 |
| 3,357,661 | 12/1967 | Aakjar..................... | 280/96.2 A X |
| 3,427,897 | 2/1969 | Engelmann........................ | 74/588 |

*Primary Examiner*—David Schonberg
*Assistant Examiner*—John P. Silverstrim
*Attorney, Agent, or Firm*—Hill, Gross, Simpson, Van Santen, Steadman, Chiara & Simpson

[57] ABSTRACT

A steering linkage incorporating a stamped centerlink wherein all openings for acceptance of the sockets or bolts are punched, rather than machined. In one embodiment, one end of the centerlink is rolled to provide a sliding shaft for the idler end of the link. In another embodiment, threaded sleeves for toe adjustment on the linkage arms are eliminated and toe adjustment is provided for through a larger-than-normal opening for the sockets or bolts which may have one side thereof threaded.

10 Claims, 8 Drawing Figures

PATENTED JUN 3 1975    3,887,211
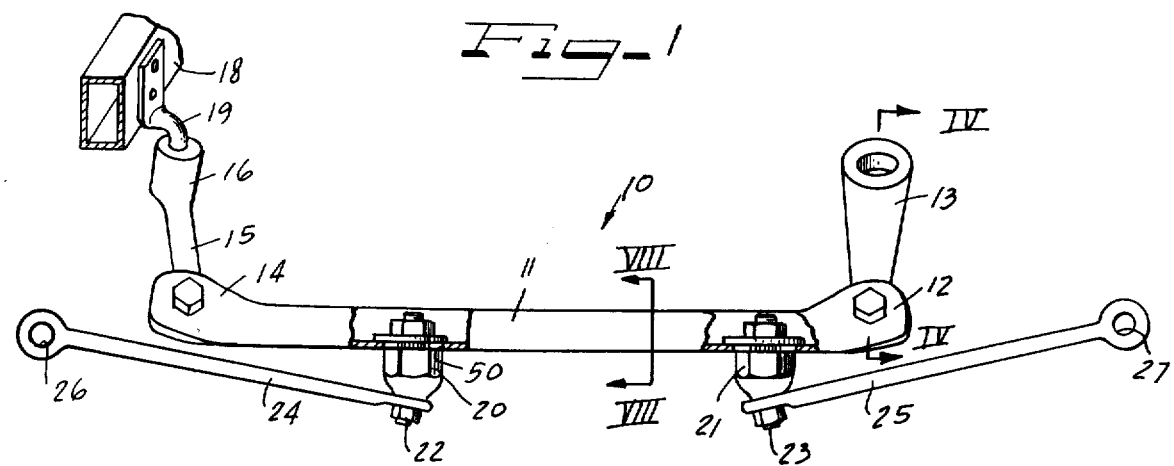
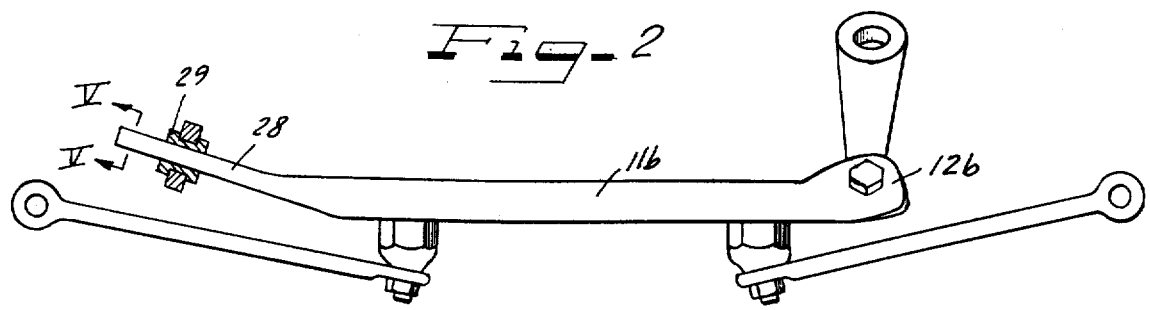
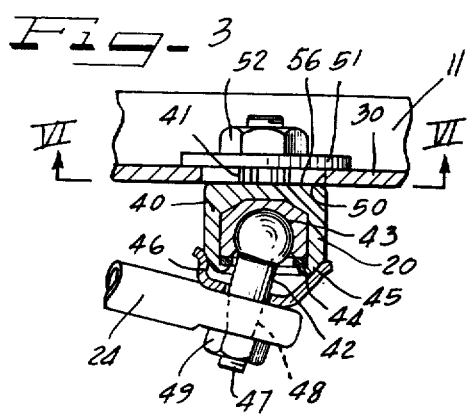
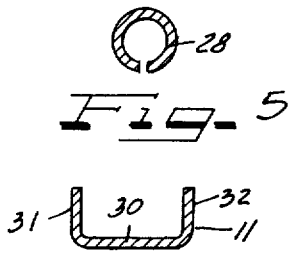
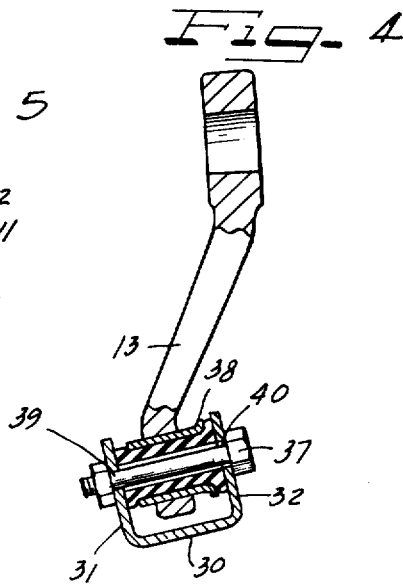
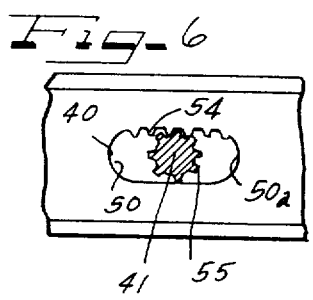
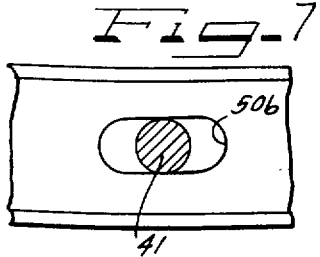
INVENTOR.
SYLVESTER S. MAZUR
ATTORNEYS

3,887,211

STEERING LINKAGE

BACKGROUND OF THE INVENTION

1. Field of the Invention

This invention relates to automotive steering linkages.

2. Prior Art

Automatic steering linkages, especially those of the parallelogram type, which incorporate a centerlink suspended between a pitman arm and an idler arm to which are attached tie rods, are normally constructed with a forged centerlink. Manufacture of the forged centerlink complete with a provision therein for openings for receipt of the pitman arm bracket and idler arm connection as well as the tie rod socket, is expensive. While it has been suggested to eliminate the need for the idler arm, see for example my U.S. Pat. No. 3,525,533, it has not been suggested to provide a stamped centerlink.

Normal tie rods incorporate two members having sockets at one end thereof and threads at the other end thereof, the threaded ends being connected together by a turnbuckle sleeve. This has allowed adjustment of the dirigible wheels controlled by the linkage, such adjustment normally being referred to as "toe" adjustment. Provision of such multipiece tie rods is expensive.

SUMMARY OF THE INVENTION

My invention overcomes the deficiencies of the prior art and provides a stamped centerlink steering linkage. Further, the invention provides a method and means for attachment of the tie rods to the centerlink which allows adjustability at that point, thereby eliminating the need for adjustability within the length of the tie rods.

The centerlink of this invention is a stamped length of metal, preferably normally U-shaped in cross-section, which has openings for acceptance of the sockets or bolts punched therethrough.

The openings for receipt of the tie rod connecting sockets comprise elongated ovals thereby allowing lateral movement of the sockets with respect to the centerlink, whereby the effective distance between the center of the centerlink and the wheel can be changed. In a preferred embodiment, the socket connecting the tie rod to the centerlink has a bolt extending from the bottom thereof, the bolt having a splined portion which is received in the opening in the centerlink, the opening in the centerlink having one side thereof toothed to receive the spline. In this manner, lateral movement of the socket within the opening can be achieved only by rotation of the bolt end of the socket.

It is therefore an object of this invention to provide a steering linkage having a stamped centerlink.

It is another object of this invention to provide an adjustable steering linkage wherein adjustment of the linkage is accomplished at the attachment point between the tie rods and centerlink, eliminating adjustability of the individual tie rods.

It is yet another and more specific object of this invention to provide a steering linkage incorporating a stamped centerlink with punched openings therein for attachment of the tie rod sockets, the openings being sufficiently large to accommodate movement of the sockets therein.

It is yet another and specific object of this invention to provide a steering linkage incorporating a stamped centerlink having a rolled end for insertion through a slip bushing to eliminate the idler arm.

It is yet another and more specific object of this invention to provide a steering linkage which eliminates the necessity of individually adjustable tie rods and provides for adjustability of the linkage at the point of attachment of the tie rods to the centerlink.

It is a specific object of this invention to provide an adjustable steering linkage wherein the tie rods are attached to the centerlink through a bolt extending from the tie rod joint socket through an opening formed in the centerlink, the tie rod joint socket bolt having a splined section which mates with teeth formed on the wall of the centerlink opening whereby the bolt can be moved laterally in the opening only by rotation thereof.

It is a general object of this invention to provide an improved steering linkage.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 1 is a perspective view illustrating a parallelogram steering linkage according to this invention.

FIG. 2 is a perspective front view similar to FIG. 1, illustrating a modified form of the steering linkage of this invention.

FIG. 3 is a fragmentary cross-sectional view of the attachment between the centerlink and tie rods of the linkage of this invention.

FIG. 4 is a partially sectional view of a pitman arm-centerlink connection of the steering linkage of this invention taken along the lines IV—IV of FIG. 1.

FIG. 5 is a cross-sectional view taken along the lines V—V of FIG. 2.

FIG. 6 is a partially sectioned fragmentary view taken along the lines VI—VI of FIG. 3.

FIG. 7 is a view similar to FIG. 6 illustrating another modification of the tie rod to centerlink connection.

FIG. 8 is a cross-sectional view taken along the lines VIII—VIII of FIG. 1.

DESCRIPTION OF THE PREFERRED EMBODIMENTS

FIG. 1 illustrates the steering linkage 10 of this invention in a standard parallelogram linkage assembly. The assembly includes a centerlink member 11 which has one end 12 thereof attached to an end of the pitman arm 13 which operates from the steering gear box. The other end 14 of the centerlink member is attached to one end of an idler arm 15, the other end 16 of which includes a movable joint attachment to a frame 18 carried bracket 19.

By use of the idler arm which has movable stud joints at either end thereof, when the pitman arm is cranked through an arc, the centerlink moves laterally in an arcuate manner. Two ball stud sockets 20 and 21 are attached to the centerlink intermediate the ends thereof and the studs 22 and 23 thereof are attached to modified tie rods 24 and 25. The other ends 26 and 27 of the tie rods are attached to the dirigible wheels of the vehicle for parallel steering.

In prior art linkages, the centerlink member was forged and had two intermediate openings machined therein to which the sockets 20 and 21 were attached. In such prior art assemblies, the tie rods were multi-piece assemblies which were adjustable lengthwise by means of a turnbuckle sleeve attachment. This allowed the length of the turnbuckle to be modified to produce the desired parallelism between the dirigible wheels. The turnbuckle sleeves were fastened to the tie rods by means of circumferential clamps. This type of prior art tie rod had numerous problems associated therewith. Amoung these were difficulty in toe setting with bent tie rods because the length of the tie rod assembly changed after tightening of the turnbuckle sleeve clamps. Additionally, the threads for receiving the turnbuckle sleeve constitute a weak spot on the tie rod, required special design consideration in that they must be designed on the action line and include a notch factor for fatigue considerations. Further, improper tightening of the clamps can lead to separation of the tie rod assembly and oftentimes the threads themselves jam at assembly.

Further, with modern vehicle design emphasizing low silhouettes, it was difficult to adjust the tie rods on the vehicle because of lack of clearance around the tie rod. Normally, the centerlink member had the greatest clearance, even in low silhouette vehicles. However, clearance oftentimes diminished from the centerlink clearance to the tie rod clearance.

The present invention overcomes the disadvantages of the prior art and provides for a stamped centerlink member and one-piece tie rods.

The invention is equally utilizable in a standard parallelogram assembly as illustrated in FIG. 1, or in a modified assembly having a rounded end 28 remote from the pitman arm end 12b with the rounded end 28 received in a slip bushing 29 as illustrated in FIG. 2. This modification is taught in my U.S. Pat. No. 3,525,533.

The centerlink member 11 or 11b is formed of stamped sheet metal which is bent into primarily a U-shaped configuration as illustrated in FIG. 8. The centerlink then has a bight portion 30 and two opposed parallel leg portions 31 and 32. In the embodiment of FIG. 1, the ends 12 and 14 may be constructed of slightly wider metal to provide wider legs 31 and 32 to provide stability for a bolt 37 to pass therethrough. A bushing assembly 38 is received interiorly of the stamped U-shaped cross section crosslink to provide a fastening for the pitman arm 13. The openings 39 and 40 through the side legs 31 and 32 through which the bolt 37 passes are punched.

The type of bushing illustrated in FIG. 4 may also be used with the idler arm 15 at the end 14 of the centerlink.

The tie rods 24 and 25 are attached to the centerlink member 11 by means of ball joints 20 and 21. As best illustrated in FIG. 3, the joint 20 consists of a cup-shaped socket 40 having a bolt member 41 projecting from the bottom thereof. A ball-ended stud 42 is received in a bearing block 43 in the housing and retained therein by a retaining member 44 over which a portion 45 of the wall of the housing is peened. A boot seal 46 may be used to protect the interior of the housing from dirt and retain grease therein. The shank of the stud 42 has a threaded end as at 47 which projects through an aperture 48 in the tie rod 24. A nut 49 on the end of the shank of the stud retains the tie rod in place.

The socket is attached to the centerlink member 11 by passing the bolt portion 41 through a stamped opening 50 in the bight 30 of the centerlink member and thence through a washer 51 and retaining nut 52.

As can be seen in FIGS. 3, 6 and 7, the stamped openings 50, 50a and 50b are not circular and have a greater diameter lying along the length of the centerlink member 11. Their minor diameter, transverse of the centerlink, is approximately equal to the diameter of the bolt portion 41. In this manner, the sockets 20 and 21 may be positioned at different points along the length of the centerlink member within the confines of the opening 50. This allows adjustment for toe to be made by moving the socket to centerlink connection rather than by adjusting the length of the tie rods 24 and 25. In the case of the embodiment illustrated in FIG. 7, this is accomplished solely by loosening the nut 52 and sliding the socket to the desired point where the wheels are in parallel relation. Thereafter, tightening the nut until sufficient friction is created between the clamp surfaces to maintain the socket in position will set the toe adjustment. This system simplifies production line adjustment of toe as the operator is only required to move the socket until the desired toe is obtained and tighten one nut. With previous systems, two nuts normally had to be adjusted. Additionally, the toe adjustment is now done towards the center of the car where there is additional clearance for the operator to make the required adjustments.

FIG. 6 illustrates a modified form of the invention wherein the opening 50a has a plurality of teeth 54 formed along one side wall thereof. The bolt 41 has a short splined section 55 extending from the bottom 56 (FIG. 3 of the socket 40 a short distance. The spline is such as to provide mating teeth for the teeth 54 and the opening 50a is dimensioned such that the spline mates with the teeth on the centerlink member on one side and has a very shallow clearance on the opposite side. Therefore, when the socket is rotated, it will cause the socket to move from one side of the elongated hole 50a to the other side so that the desired amount of toe change can be obtained. The provision of the spline and mating teeth 54 requires rotation of the socket to move it laterally, thereby reducing the chances that the socket will wander during operation of the vehicle.

It can therefore be seen from the above that my invention provides an improved steering linkage incorporating a stamped and punched centerlink in place of the normal forged centerlink, and which incorporates solid tie rods in place of the multi-piece prior art tie rods and which attaches the tie rods to the centerlink member by means of socket carried bolts projecting through elongated punched openings in the centerlink whereby the sockets are movable along the length of the centerlink to provide toe adjustment.

Although the teachings of my invention have herein been discussed with reference to specific theories and embodiments, it is to be understood that these are by way of illustration only and that others may wish to utilize my invention in different designs or applications.

I claim as my invention:

1. In a vehicle steering linkage, the improvement of a stamped centerlink member, said centerlink member substantially U-shaped in cross section having punched openings adjacent either end thereof in the side legs of the U for attachment of pitman arm and idler arm assemblies and stamped openings through the bight thereof intermediate the ends for attachment of tie rod sockets.

2. The improvement of claim 1 wherein the said tie rod sockets have portions thereof projecting the said punched openings, the said portions freely movable in the said openings whereby the vehicle wheels associated with the said linkage may be adjusted for toe by moving the said portion within the said openings and means for attaching the said sockets to the said centerlink member in non-movable relation.

3. In a vehicle steering linkage, the improvement of a stamped centerlink member, said centerlink substantially U-shaped in cross section having side legs and a bright section interconnecting the side legs, the side legs at one end thereof having punched openings therein for attachment of a pitman arm assembly, the other end of the said centerlink being rolled into a substantially circular cross section for engagement with a slip bushing, and punched openings are provided through the bight of the said centerlink intermediate the ends thereof for attachment of tie rod sockets.

4. The improvement of claim 3 wherein said tie rod sockets have portions thereof projecting through the said punched openings, the said portions freely movable in the said openings whereby the vehicle wheels associated with the said linkage may be adjusted for toe by moving the said portion within the said openings and means for attaching the said sockets to the said centerlink member in non-movable relation.

5. In a steering linkage for attachment to dirigible wheels of a vehicle incorporating tie rods each attached at one end to a centerlink and at the opposite end to a dirigible wheel, the improvements of one piece tie rods attached to said centerlink, said centerlink having axially elongated slots, said tie rods having adjusting means axially shiftable in said slots, and locking means on said adjusting means securing said adjusting means in selected fixed positions in said slots, whereby the points of attachment of said tie rods to the said centerlink may be moved to provide for toe adjustment of the dirigible wheels of the vehicle attached to the ends of the said tie rods.

6. A steering linkage having a movable centerlink, spaced-apart openings through said centerlink, said openings having a greater dimension along the length of the said centerlink than along the width thereof, a plurality of sockets, said sockets having portions thereof projecting therefrom, said portions extending through the said centerlink openings, said portions freely receivable in the said openings whereby the said portions and the said sockets are movable lengthwise of the said centerlink, and means for attaching the said sockets to the said centerlink in non-movable relation.

7. A steering linkage comprising: a centerlink, socket attachment openings through said centerlink intermediate the ends thereof, sockets having members projecting therefrom, said members received in the said openings, said openings having a dimension lengthwise of the said centerlink greater than their dimensions across the width of the said centerlink, said portions having a dimension with respect to the said openings whereby the said portions are movable lengthwise of the said centerlink in the said openings, and means for preventing lengthwise movement of the said projections in the said opening unless the said projections are rotated.

8. A movable stud joint socket to centerlink connection for vehicle steering linkages which comprises: an opening in said centerlink, said opening being non-circular with a major axis and a minor axis, teeth along one wall of said opening, said one wall extending in the direction of the major axis, a projection on the socket, said projection having a cylindrical portion, said cylindrical portion splined, the splines mating with said teeth, the major diameter of said cylindrical portion substantially equal to said minor axis, the said projection extending through the said opening, and means to retain said socket with the projection in said opening and said spline indexing with said teeth, said means adjustable to control movement of said projection in said opening.

9. A vehicle steering linkage comprising a centerlink, a pair of tie rods, movable stud joints attaching said tie rods to said centerlink, said joints having a cylindrical portion extending therefrom, said centerlink having spaced-apart openings therethrough intermediate the ends thereof, said openings having a major axis and a minor axis, said major axis greater than said portions of said joints, said portions projecting through the said openings, said portions terminating in a threaded portion, nuts received around said threaded portion for enclamping a portion of the said centerlink between a main body of the said joints and the said nut with the said cylindrical portion of the said joints received through the said openings, the said cylindrical portion of the said joints movable in the said opening along the said major axis and the said nut tightenable to restrict said movement.

10. The linkage of claim 9 wherein the said cylindrical portion has a splined portion and the said opening has a toothed wall along the major axis, the splines indexing with the teeth, the major diameter of the splined portion substantially equal to the minor axis of the opening whereby the said cylindrical portion is movable along the major axis of the said opening only by rotation thereof, the splined portion intermediate the said main body of the socket and the said threaded portion of the projection.

* * * * *